US008694645B2

(12) United States Patent  
Mason et al.

(10) Patent No.: US 8,694,645 B2
(45) Date of Patent: Apr. 8, 2014

(54) TRACKING WEB SERVER (75) Inventors: Kevin Mason, Bristol (GB); Ian Griffiths, Bristol (GB); Ian Nicholas Pollard, Bristol (GB)

(73) Assignee: Procter & Stevenson Limited, Bristol (GB)

(*) Notice: Subject to any disclaimer, the term of this patent is extended or adjusted under 35 U.S.C. 154(b) by 1081 days.

(21) Appl. No.: 12/027,886

(22) Filed: Feb. 7, 2008

(65) Prior Publication Data

US 2008/0195665 A1 Aug. 14, 2008

(30) Foreign Application Priority Data

Feb. 9, 2007 (GB) .................................. 0702559.6

(51) Int. Cl.
*G06F 15/16* (2006.01)
(52) U.S. Cl.
USPC ........... 709/227; 709/223; 709/245; 709/229; 370/392
(58) Field of Classification Search
USPC .......................................................... 709/227
See application file for complete search history.

(56) References Cited

U.S. PATENT DOCUMENTS

| 5,812,769 | A | * | 9/1998 | Graber et al. ................. 709/228 |
| 6,052,730 | A | | 4/2000 | Felciano et al. |
| 6,085,242 | A | * | 7/2000 | Chandra ....................... 709/223 |
| 6,330,602 | B1 | * | 12/2001 | Law et al. ..................... 709/224 |
| 6,529,956 | B1 | * | 3/2003 | Smith et al. ................... 709/229 |
| 7,356,569 | B1 | * | 4/2008 | Kembel et al. ................ 709/217 |
| 7,388,953 | B2 | * | 6/2008 | Gallant .................... 379/220.01 |
| 7,634,572 | B2 | * | 12/2009 | Nanduri et al. .............. 709/227 |
| 2002/0078191 | A1 | | 6/2002 | Lorenz |
| 2002/0165955 | A1 | | 11/2002 | Johnson et al. |
| 2004/0243698 | A1 | | 12/2004 | Blankenship |
| 2005/0125416 | A1 | | 6/2005 | Kirsch |
| 2007/0168256 | A1 | | 7/2007 | Horstmann |

FOREIGN PATENT DOCUMENTS

| GB | 0702559.6 | 2/2011 |
| WO | 0041092 | 7/2000 |

OTHER PUBLICATIONS

Mourad A et al: "Scalable Web Server Architectures" Proceedings IEEE International Symposium on Computers and Communications, July 1, 1997 pp. 12-16.

* cited by examiner

*Primary Examiner* — Hua Fan
(74) *Attorney, Agent, or Firm* — Workman Nydegger (57) ABSTRACT

A web server is disclosed that is configured to track requests for web pages on a third party web server. The tracking web server traps a web page request, such as a PURL (Personalized URL) for a personalized web page, before it attempts to serve the web page requested. The URL of the web page request is analyzed to determine the location of the requested page on a third party server, and details of the contact with which the personalized web page is associated. Receipt of the web page request is then recorded in a memory associated with the server, and the web page request is forwarded to the third party server for processing. The redirection to the third party web server may be seamless, such that the contact requesting the page does not know of the redirection. In this way, a tracking web server is provided which can supply a personalized tracking and forwarding function.

33 Claims, 7 Drawing Sheets

| PURL details | Security | Target Website | Details |
|---|---|---|---|
| | | | |
| trackingwebsite#1 | | | |
| welcomepage.htm | | www.proprietorwebsite#1/page1 | |
| about.htm | | www.proprietorwebsite#1/page2 | |
| | | | |
| john.smith | 1656 | | Yes: 12/12/2006, #3 |
| john.smith | 9978 | | No: |
| robert.jennings | | | No: |
| gladys.eden | | | Yes: 18/12/2006, #1 |
| | | | |
| trackingwebsite#2 | | | |
| welcomepage.htm | | www.proprietorwebsite#2/page1 | |
| about.htm | | www.proprietorwebsite#2/page2 | |
| index.htm | | www.proprietorwebsite#2/page2/index | |
| | | | |
| john.smith | | | No: |
| rupert.flemming | | | Yes: 4/1/2007, #1 |
| angela.green | | | No: |
| | | | |

TRACKING WEB SERVER

This application claims the benefit of priority under 35 U.S.C. §119 to United Kingdom Application No. 0702559.6, filed on Feb. 9, 2007, having a title of "Tracking Web Server," the content of which is hereby incorporated by reference in its entirety.

This invention relates to a tracking web server, and in particular to a method and system of tracking and redirecting web page access on a networked computer system such as the Internet.

Computer networks link many computers together such that data on one computer is accessible over the network to users of another computer. The Internet is one example of a large scale network, and is estimated to contain approximately 20 million computers. Web servers are networked computers that store data and that are configured to supply that data to client computers in response to data requests. Much of the data available on the Internet is the form of code defining web pages. These are pages that are intended to be displayed in viewing software on a user's computer's. Such viewing software is typically referred to as a web browser. A web page will usually comprise at least text or graphics, but increasingly, will also comprise multimedia data in the form of audio and video clips, animations, and interactive programs. Often, several web pages are provided together so that a user can navigate between them using links, known as hyperlinks, in the pages themselves. An arrangement of several linked pages, or indeed a single page, is referred to as a web site. A web site will typically have a top level, or home page, from which the other pages can be accessed.

Each web page has a unique Uniform Resource Locator (URL), which acts as address information to identify the page, and tell the web browser where to find the data. A URL comprises a string of ASCII characters that define the type of language used for the request, such as "http:", as well as a string of ASCII characters that define a name associated with the location where the requested data is to be found. The name is known as a domain name and serves to make the URL user friendly and easier to remember. Once a URL has been entered into a web browser, either by typing it directly into a field known as the address bar, or by selecting a hyperlink from a displayed page, the web browser contacts the DNS (Domain Name System) to determine from the domain name entered the IP address of the web server of computer where the data is held. The IP address is a number that is assigned to every computer attached to the Internet for Identification and routing purposes.

For the developers or providers of such web pages, it is often important to know whether or not their web pages are being accessed and viewed by users, and there is therefore frequently a need to track data requests to the developer's web site.

Although, search engines allow web pages to be catalogued and presented to a user, from the view point of the developer or presenter of the web site, it is a passive process. A user may or may not access the web page, and apart from a feature known as a hit counter, the developer would be none the wiser. The identity of the user also remains unknown. Furthermore, search engines typically only direct users to the top level page of a web site.

Often, developers will wish to direct a user to view a specific section of their website, known as a microsite. Increasingly, there is a desire to personalise the microsite, so that when a particular users accesses it, they see web pages in which the content is adjusted to their needs. This might simply be a personalised greeting, but could be changes in content of the data presented. Additionally, developers will wish to know whether contacts who have been invited to view the site have in fact done so.

Personalised URLs in combination with tracking web sites are often used to provide web site proprietors with a mechanism for tracking user access requests. The tracking web site is usually hosted by a third party on a separate web server to that of the web site proprietor, as the program code that performs the tracking can be cumbersome and resource intensive, and the web site proprietor is unlikely to have the resources or technical know how to implement such code themselves. The need for tracking facilities is also intermittent, so it would be uneconomical for a web site proprietor to host such software on their machines. The tracking site will therefore often contain web pages with content that corresponds to those of the web site proprietor, but that is linked to the appropriate tracking code. Although, the web site is hosted on a separate web server, the web site proprietor will usually wish to give the appearance that the tracking site is part of their own web site, and so will choose similar domain names for the site. A personalised URL (PURL) is the means by which a web site proprietor directs a user to the tracking site. A PURL is a URL for a web page, but one in which the domain name of the web page also contains a personal identifier for the user to which the PURL has been sent. An example PURL is http:/www.trackingwebsite/john.smith/welcomepage.htm which corresponds to a tracking page for John Smith. The parts of the domain name that specify "trackingwebsite" and "welcomepage" can be defined by the web site proprietor so that they appear to be related to their own web site. A PURL can be sent to a user or contact in any suitable way, such as by email or other electronic communication, mail shot, and word of mouth.

With existing technologies, a number of technical difficulties are encountered at the tracking web server, and these will now be discussed in more detail. First, a web page has to exist for each PURL sent to a user or contact, otherwise on entering the PURL into their web browser, the contact would receive a "Page Not Found" error message. Also, if the web page is to present content from the web site proprietor's web site to the contact, that content has to be stored on the tracking web site. Some tracking code allows the web site proprietor's content to be recycled for each of the PURL web pages, so that only one copy of the content needs to be stored for each tracking web site proprietor. The application code that cooperates with the web pages specified by the PURLs, then retrieves this content and presents it to each contact, when the contact views their personalised page using the PURL. Nevertheless, if the tracking server is hosting tracking web sites for many different web site proprietors, the content of each of those proprietors has to be stored. Also, each web site proprietor requires a separate tracking web site and instance of the application code, for the web page names, such as "welcomepage" in the above example, to be freely usable for different proprietors.

Furthermore, as noted above, a web page has to be provided for each contact that is to be tracked. For each page that is to be implemented, using Microsoft ASP.Net and C# for example, two text files need to be produced: the page HTML file, with a ".aspx" extension; and the page code file, with a ".aspx.cs" extension. We have appreciated that, even if the two files were encoded to have absolutely minimal contents, they would place a considerable strain on system resources.

For example, a single text file and code file pair, with minimum implementation, would take up about 1 Kb of disk space. For a typical tracking web server, with 10,000 tracking web sites or domains, and 10,000 contacts with personalised pages, approximately 500 GB of disk space is required. In addition, each one of the pages would have to be compiled, either the first time it is called by a contact, or when it is first set up. The compilation of 10,000 times 10,000 web pages would incurs severe disk activity, at the web server, strains memory usage and CPU overhead, on top of the resources required to generate and write out each of those files to disk once they are created.

Also, when each page is accessed by a contact, disk activity is required to load the page into memory. The more PURLs exist, the more concurrent requests for pages are likely to occur. An individual disk can only process one request at a time since the disk head has to physically move to the correct sector of the disk to read the information. Tracking a large number of PURLs, means that a large number of concurrent request are likely to be received, which would cause later requests to be queued until previous ones had been completed, slowing the responsiveness of the server.

We have therefore appreciated that there is a need for a tracking server that address the technical problems mentioned above.

SUMMARY OF THE INVENTION

The invention is defined in the independent claims to which reference should now be made. Advantageous features are set out in the dependent claims.

BRIEF DESCRIPTION OF THE DRAWINGS

A preferred embodiment of the invention will now be described in more detail, with reference to the drawings, in which.

DETAILED DESCRIPTION OF THE PREFERRED EMBODIMENTS

Figure 1:
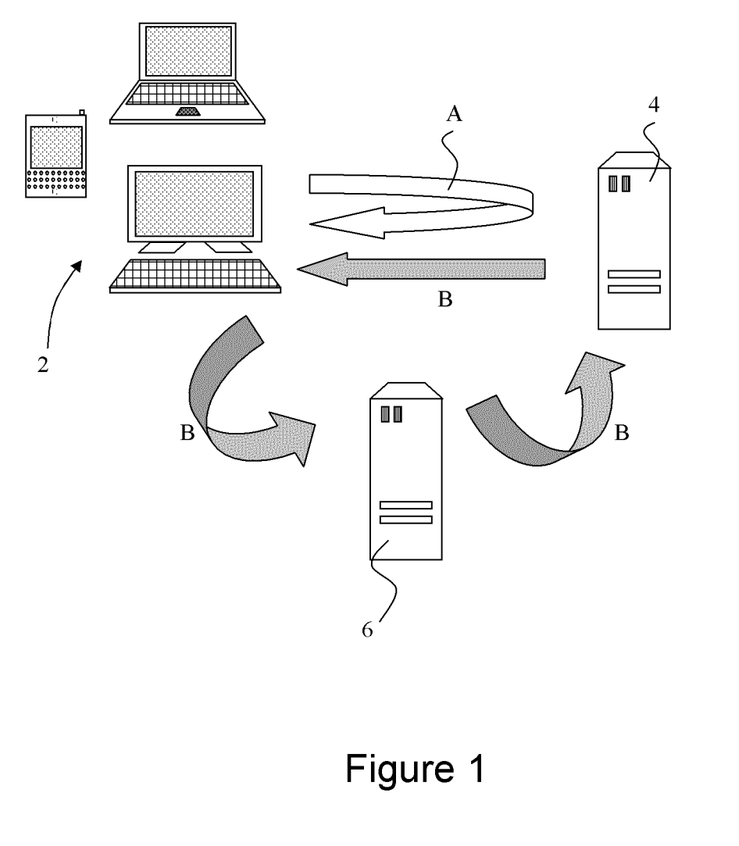
FIG. 1 is an illustration of a typical web page look up request, compared with the preferred embodiment.

FIG. 1 illustrates the usual process involved in accessing data across the internet. A software application known as a web browser runs on a client work station or personal computer (PC) 2 and provides means for accessing the internet. Other client computers could be laptops, personal digital assistants, or internet enabled mobile phones for example, while examples of internet web browsers are Microsoft's Internet Explorer, Mozilla's Firefox, and Netscape's Navigator.

Using the web browser, a user requests information from a web server 4 over a wired or wireless internet connection. The request is encoded in Hypertext Transfer Protocol (HTTP) and is transmitted to the web server identified by the IP address or domain name in the user request. The address is obtained in known fashion from a web page, and is typically included in a hyperlink.

The web server receives the request for the target web page from the user, identifies the address of the requesting client workstation from the request, and transmits the target web page data to the client. The client computer then displays the target page in its web browser. The data flow in this case, occurs between the client workstation and the target web server 4, and is indicated by the arrow A in the diagram. The web server 4 in this case could be that of a web site proprietor, or could be a tracking server hosting a tracking web site for the web site proprietor for example.

The preferred embodiment of the invention comprises a second web server 6, which acts as intermediary in the transfer of data from the target web server 4 to the client, and which shall be referred to as an tracking server. The tracking server provides a tracking facility which allows a web site proprietor to track user access requests with PURLs, but which alleviates the strain on the tracking server resources. When a user wishes to access a web page specified by a PURL that they have received, they are first directed through the tracking server 6, which logs their request for tracking purposes and forwards them onto a web page on the target web site of the proprietor. This is achieved without relying on web pages that encoding redirection requests, which as noted above would not allow memory or CPU usage to be conserved. The data flow in the case of the preferred embodiment is illustrated in FIG. 1, by the arrow B.

The operation of the preferred embodiment will now be described in more detail. The preferred tracking server implements virtual web pages that correspond to the PURLs generated and distributed to users. As the virtual web pages do not exist, the operation of the tracking web server is modified, so that web page requests are intercepted before the server attempts to present the page to the user, thereby avoiding "Page Not Found" errors. The HTTP request for the virtual pages is instead trapped and processed to compare it with redirection information stored at the tracking web server. The redirection information effectively forwards the web page request on to the web site of the web site proprietor, and can be implemented so that the user is unaware of the redirection. Concurrently, the tracking server logs the access request, recording the fact that the PURL was accessed.

Figure 2:
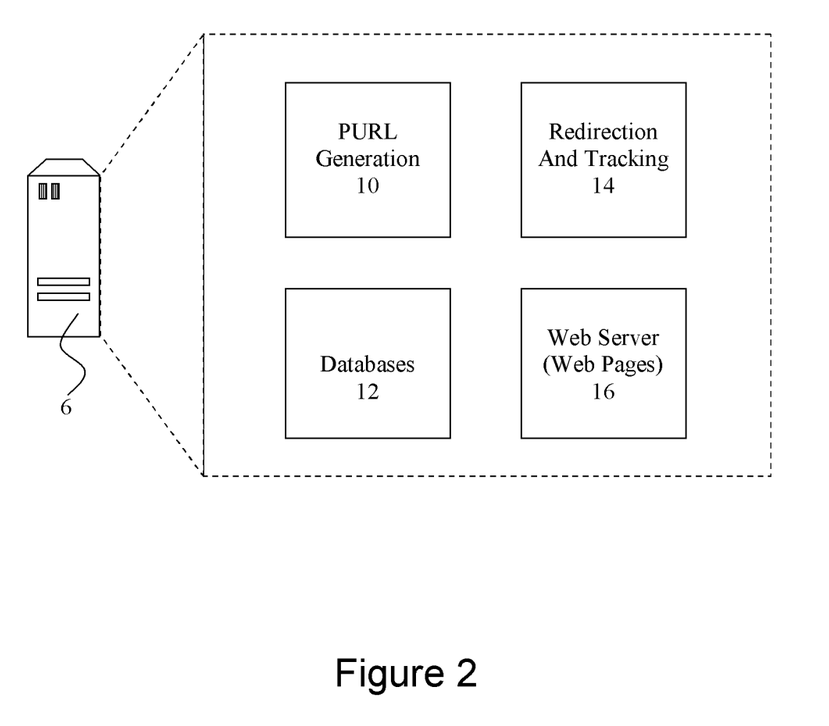
FIG. 2 is a schematic illustration of the functions provide by the tracking server according to a preferred embodiment of the invention.

The preferred tracking server 6 therefore provides the necessary functionality for the proprietor of a third party web site to generate personalised URLs for users to be directed to their web site, and to monitor the uptake of those requests. The broad functionality provided by the software code and data structures on the tracking server is illustrated in FIG. 2.

The tracking server 6 comprises software code 10 configured to generate PURLs based on the information provided by web site owners. Such owners will be referred to as tracking entities for convenience, whereas those who are issued with a PURL for viewing a tracking entity's web site, and whose access attempts will be monitored, will be referred to as contacts.

The tracking server also comprises a database 12 or memory for storing information necessary to perform the tracking. It therefore contains information identifying each tracking entity using the tracking server, information identifying the contacts to be tracked, and information identifying whether a contact has accessed the specified web site of the tracking entity.

The tracking server comprises software code that performs a Redirection and Tracking function 14. This function identifies an incoming web page request from a contact, logs the request and any other specified information in the database 12 under the relevant tracking entity, and forwards the contact's request onto the target web site of the tracking entity.

The tracking server 6 also provides a standard Web Server function 16 and therefore stores a number of web pages for this purpose. Web pages can be provided for requesting information from tracking entities who access the tracking server to generate PURLs, and/or requesting information from contacts, if more information is needed before they can be redirected.

Figure 3:
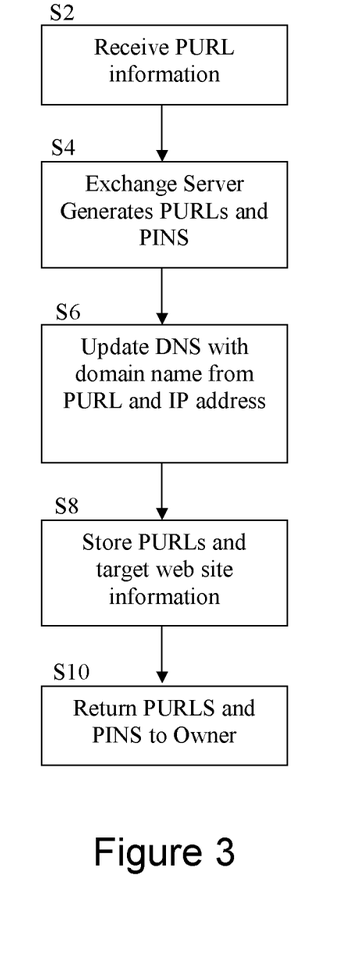
FIG. 3 is a flow chart illustrating the process of generating a PURL.

The operation of the exchanger server's PURL generation function will now be explained in more detail, with reference to FIG. 3.

Firstly, in step S2, the tracking entity supplies information to the tracking server 6, identifying the contact for whom the PURL is to be generated, the top level domain name of a tracking web page that is to be included in the PURL, and the web page within the domain to which the contact is to be directed when they select the PURL, and for which the contact's access request is to be logged.

This information can be provided either by having the tracking entity interact with web pages provided by the web server 16, or by other means such as mail, email, other electronic message or telephone. The tracking server processes this information to identify:

1) the top level domain name of the tracking web site which is to be included in the PURL;
2) optionally, the name of a web page on the tracking web site given in 1);
3) information identifying the contact for whom the PURL is to be generated; and
4) information specifying the domain name of the target web site at which the tracking entity's web pages are stored, and which is to be associated with the combination of tracking domain and specific web page. This may be a URL or more generally a Uniform Resource Indicator, or IP address. The target web pages could be public or private. Public web pages for example can be discovered by a search engine and accessed by any user regardless of whether they have received PURL. Private web pages however are not be discoverable and could only be accessed by means of the PURL.

The tracking web site is a virtual web site used by the tracking server to monitor the access requests of the contact. It is virtual because although an entry is placed in the Domain Name Server (DNS) for the top level domain name of the tracking web site, no physical pages actually exist. Instead, a look up request to the DNS for that domain name is configured to return the IP address of the tracking server 6.

The tracking entity can therefore choose the domain name of the tracking web site to resemble or give the appearance of a site that is related to their own web site, without actually having to implement the web pages for the tracking domain. The tracking domain is used by the tracking server to monitor and log access requests to the tracking web site, without having to store web pages that correspond to the domain name.

The domain name of the tracking web site can then be stored in the DNS by the tracking server, such that when web browsers request information from a PURL referencing that site, they are directed to the tracking server. Alternatively, the tracking entity may simply register their own choice of domain name with the DNS and then supply this as part of the PURL information to the tracking server.

The optional name of the web page on the tracking domain can be used by the tracking entity to specify different pages on their own or target web site to which contacts are to be ultimately redirected. For example, the domain name "welcomepage.htm" might send a contact to a page on the target web site with an introduction welcoming them to the site, while the web page "about.htm" might skip this introduction and send the contact straight to a page describing the purpose of the site. Any web pages of the tracking domain that are referenced are necessarily also virtual and are merely used to control the redirection. Although, it is envisaged that most PURLs will be based on the contact's name supplied by the tracking entity, the personal information in 3) could be an email address, nick-name, or even any unique identifier that the tracking entity has decided to use to refer to the contact.

The personalised URL is as much as possible generated to be unique for the combination of user and tracking web site. It may for example, be:

http:/www.trackingwebsite/john.smith/welcomepage.htm where 'www.trackingwebsite/' is the top level domain name of the tracking web site address specified by the tracking entity, John Smith is the name of the user who is to receive the personalised URL, and 'Welcomepage.htm' is a virtual web page on the tracking domain. The order in which the elements making up the PURL is not significant, though it is necessary to display the top-level domain name first.

Once a PURL, like that above has been generated by the tracking server, it is stored with the URLs of the target web site on the tracking entity's web site, so that redirection and tracking can take place.

Where, the two contacts have the same name the PURL could be generated to contain a number after the contact's personal information so that respective contacts can be distinguished. Alternatively, two identical PURLs may be generated by the tracking server, and distinguished from one another by using an identification code, such as a password or PIN.

Having received sufficient information from the tracking entity to generate the PURLs, the tracking server generates in step S4 a candidate domain name for an individual contact, such as that shown in the example above. If two contacts have the same name, then an identification code, say a password or PIN (Personal Identification Number), may also be generated so one contact can be distinguished from the other. The PIN could contain text as well as, or instead of numerical digits. If a contact having the same name as another, inputs their PURL and their web browser connects with the tracking server, the tracking server is configured to supply them with one or more web pages that ask them to enter the unique identification code so that they can be identified.

If the domain name of the PURL has not already been registered by the tracking entity then, in step S6, the tracking server contacts the relevant Domain Name Server and registers the top level domain name of the PURL that has been generated, inserting its own IP address as the relevant look up address. Thus, if the PURL is input by a contact, then their web browser will connect with the tracking server.

In step S8, having successfully generated the PURL for a contact, and any necessary password or PINs, the tracking server updates the database so that the PURL and any identification code are stored under the respective tracking entity in the database. Thus, when a contact inputs the PURL into their web browser, the tracking server will receive the request, and be able to check the database and determine if the PURL included in the request is stored in the database.

Figure 4:
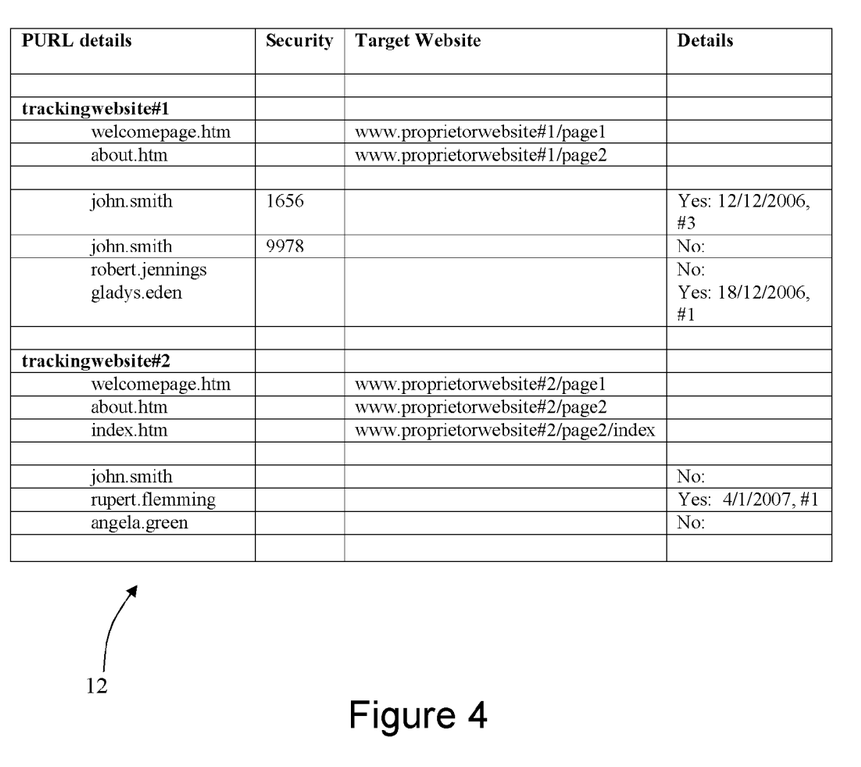
FIG. 4 is a schematic illustration of a database or memory structure arranged to store information relating to personalised URLs, as well as tracking information.

The contents of the database are shown schematically in FIG. 4. The left most column called "PURL details" contains the necessary ASCII information included in the PURL. The tracking web server breaks down the received PURL into the name of the tracking site, the name of the web page on that site, and the name of the contact. From the name of the tracking domain it has identified, the tracking server can move to the right part of the database to determine the redirection details, and to record the PURL access. FIG. 4, shows two tracking domains, "trackingwebsite#1" and "trackingwebsite#2" by way of example. The second column called "Security" contains a security code or PIN that can be used to distinguish two contacts with the same name, as shown for the two John Smiths listed in "trackingwebsite#1". The third column, called "Target Website" gives the URL of the target web site that the contact is to be directed to. In the example of FIG. 4, more than one target web pages are specified for each tracking domain, depending on whether the PURL specifies the web page "welcomepage", "about" or "index" (for trackingwebsite#2). It will be appreciated that different target web sites could be listed for web page given in the PURL, and/or for each named contact. Lastly, the "Details" column stores tracking information, such as "yes/no" specifying whether the PURL has been accessed, as well as the dates on which the PURL was requested by the contact, and how many times, the PURL has been requested.

In step S10, the generated PURLs and any identification codes or PINS are then returned to the tracking entity, either by mail, email or other electronic message, or any other suitable communication means. The tracking entity can then distribute the customised PURLs to their intended contacts, inviting the contacts to view the target web site by any suitable communication means, such as email, mail, and telephone.

As noted above, the tracking server monitors data request addressed to the PURLs, and stores access information in the database for the tracking entity. Access information, will indicate, at least whether or not a contact has input the PURL to access the target web site. The information may also include, time and date, the number of times the PURL is accessed by the contact, and the IP address of the computer or workstation used by the contact for example.

Figure 5:
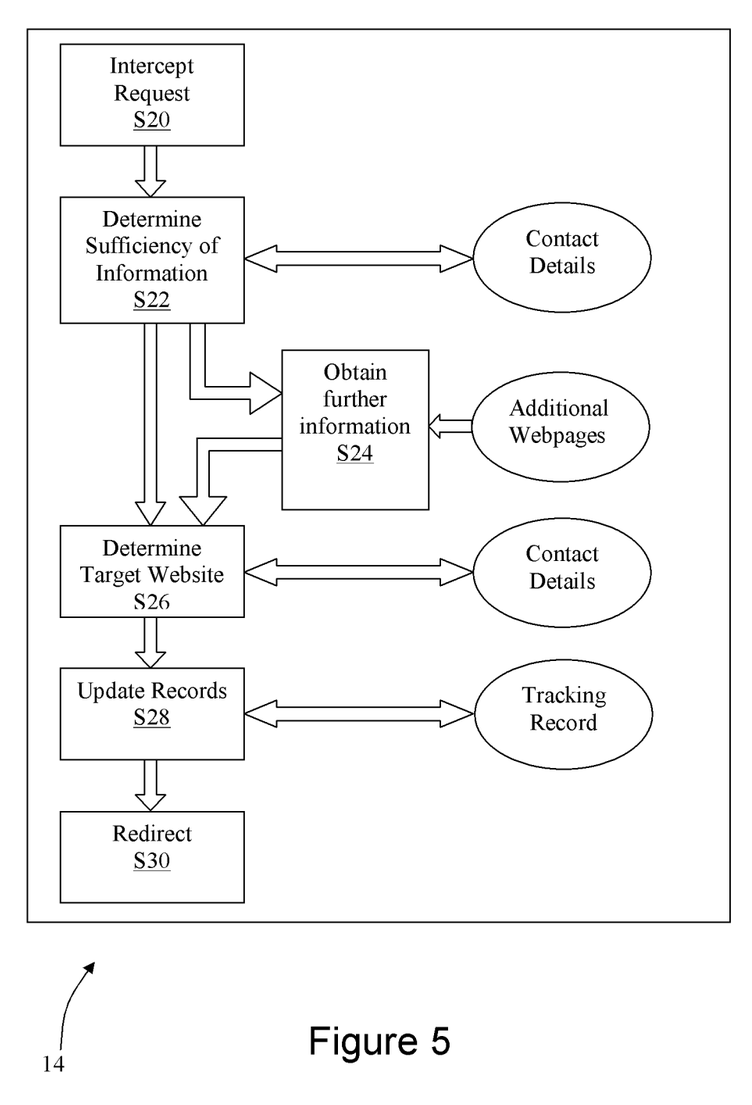
FIG. 5 is a schematic illustration of the redirecting and tracking function provided by the tracking server.
Figure 6:
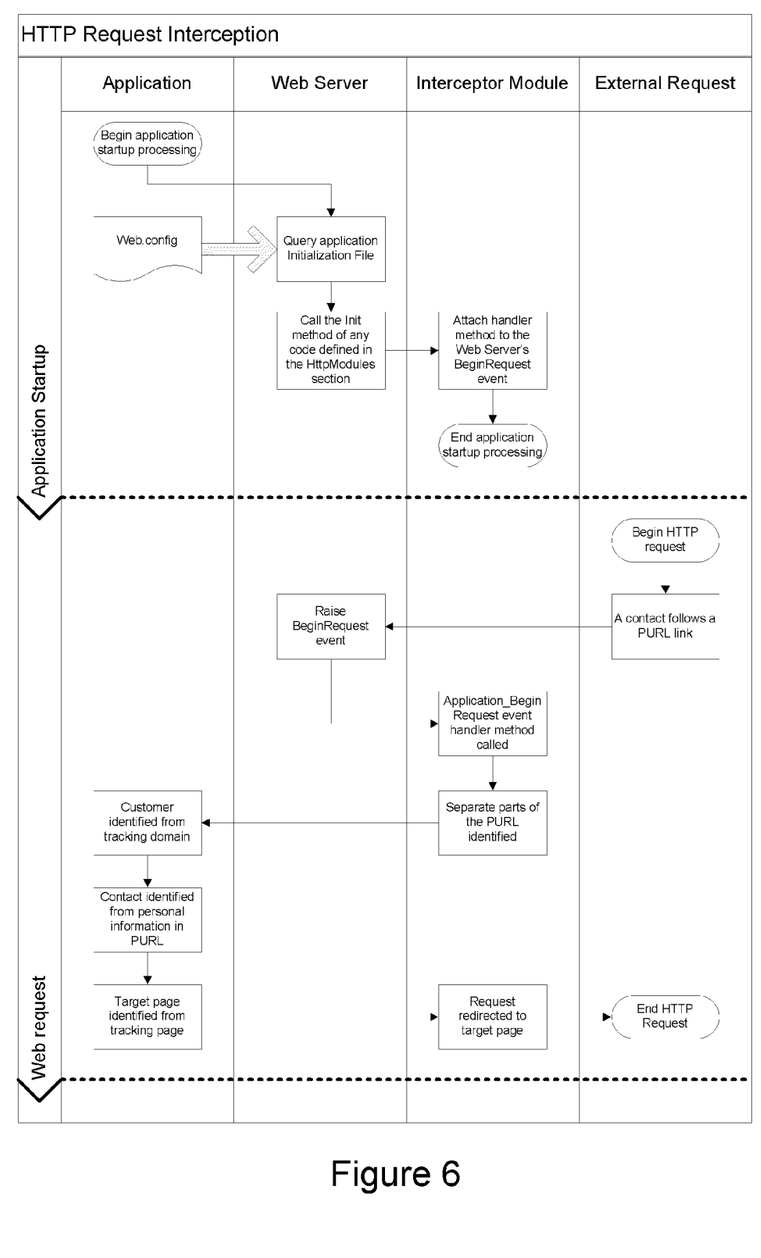
FIG. 6 is a schematic illustration of the control flow involved in trapping and analysing a personalised URL at the web server.

The operation of the redirecting and tracking function 14 will now be explained in more detail, with reference to FIG. 5. The redirecting and tracking function may be implemented in software code in any suitable programming language, in modules of computer code, objects in an object orientated programming, or as a single stand alone application.

A first functional block 20 of the software is arranged to intercept the request from the contact and to determine from the request the PURL being requested. It is referred to here as Interceptor block 20 for convenience.

Although the contact's web browser will initiate a look up request to the Domain Name Server to determine the IP address to which it should send the request, the request transmitted to the IP address itself will still include the URL or PURL in its entirety, as well as any additional data, such as any user input entered by the contact at the time the request is submitted. A receiving web server uses the domain name information in the URL or PURL, to determine which web pages (home page or sub pages) are to be transmitted in response to the request.

The tracking server does not however provide any web pages with a URL that could match the URL in the PURL of the received request, as the PURL is not used in this context to refer to a web page stored at the IP address given. Instead, the PURL is used to refer to a defined relationship between the contact and a target web site on the tracking entity's server. As the tracking server may also provide standard web server functionality that can serve web pages in response to a web page request, the Intercept block 20 is configured to trap the request before the conventional operation of the tracking server web server 16 attempts to identify which web pages are to be returned. This avoids the web server returning an error message stating that the page cannot be found. The operation of the Intercept and Tracking Block will now be explained in more detail.

The Intercept and Tracking Block is implemented as a bespoke program that cooperates with the web server software. In alternative embodiments, web servers with the appropriate interception and tracking code could be coded from scratch specifically for the purpose. In a tracking web server according to the invention, the web server software used is Microsoft's Internet Information Server (IIS) v6, in conjunction with the Microsoft .Net 2.0 Application Programming Interface (API) framework, and the program is implemented in Microsoft C#.

The bespoke program is registered as an extension of the web server application, and is called by the web server for each HTTP request prior to attempting to serve the page.

This is achieved by implement a new public class inheriting from the IHttpModule interface, in order to hook into the IIS event mechanism to intercept and process the HTTP requests before the web page is served:
public class InterceptorModule:IHttpModule The web application configuration file (web.config) of the web server software is configured to use the new InterceptorModule for all HTTP requests. This causes the InterceptorModule to run the first time the web application starts.

```
<system.web>
    <httpModules>
        <add name="InterceptorModule"
        type="{applicationname}.InterceptorModule,
        {applicationname}"/>
    </httpModules>
</system.web>
```

Applicationname is the name space used in the web server application.

This code adds the Interceptor module to the httpModules section of the system.web part of the web.config file. Since InterceptorModule implements the IHttpModule interface, the Init method of the InterceptorModule is called automatically by the web server at start up.

In the InterceptorModule class, an event handler is attached to the web server software BeginRequest event, referring to the InterceptorModule method Application_BeginRequest. The event handler will then be called every time the BeginRequest event is raised, which is every time HTTP request is received web server.

```
public void Init(HttpApplication application)
{
    application.BeginRequest += new
        EventHandler(Application_BeginRequest);
}
```

The Application_BeginRequest is specified in the InterceptorModule class as follows.

```
private void Application_BeginRequest(object sender, EventArgs e)
{
    System.Web.HttpApplication app = (HttpApplication)sender;
    System.Web.HttpContext con = app.Context;
```

-continued

```
    string inUrl = con.Request.RawUrl;
    // Code to manipulate the Application and Context objects
    // and URL to identify domains, customers, contacts and pages
    // goes here
}
```

The method retrieves the HttpApplication and HttpContext objects from the event, and the URL requested from the HttpContext object:

Once the URL is detected, in step S22, the tracking server attempts to match the text of the URL contained in the received data request, with the entries that have been stored in the database 12 in step S8, using the code in the Application_BeginRequest method. Various formulations of code for reading information from a database exist, and would be evident to the skilled man.

If a single match is found, then the appropriate look-up request for the target web site is determined by reading off the corresponding target web site domain name from the database in step S26.

In step S28, the tracking server then updates the database to record receipt of the access request from the contact. Data specifying the time and date of the request, the total number of times the request has now been made, the IP address from which the request was received, may also be recorded.

In step S30, a new web page request is formulated for the contact, based on the domain name of the target web site specified in the database 12. The return IP address of the contact web browser, and any other user input data originally contained in the web page request from the contact is also extracted and inserted into the newly formulated request. This web page request is then transmitted by the tracking server to the target web site, which in turn retrieves the page and transmit it back to the contact's web browser.

The request is formulated by including inserting the target URL into a string, such as "www.proprietorwebsite#2/page1", as illustrated in FIG. 4. The tracking server then issues a command "con.Response.Redirect.(outURL)", where con refers to the System.Web.HttpContext object that is obtained from the previous page. **Query string suffixes can optionally be included at the end of the target URL to include any user input.

In that case the URL string could be "www.proprietorwebsite#2/page1?uid=2389809". In this way, the contact can be kept entirely oblivious to the redirection and tracking function provided by the tracking server. From their point of view, the PURL they have received, will take them directly to the target pages specified by the tracking entity.

It may be the case however that the detected PURL will not be unique, because two identical PURLs have been issued to two different contacts who share the same name. In this case, when the tracking server interrogates the database 12, it will find two or more matching PURL entries. Each entry will however specify a different identification code to distinguish the contact. The tracking server on detecting the plurality of matching entries, calls up one or more pre-stored web page and transmits this to the contact's web browser.

The web pages invite the user to enter their personal identification details, and causes the contact's web browser to transit the data back to the tracking server. The tracking server can then identify the contact, look-up the appropriate target web site and continue as before.

In an alternative example of the system, it is possible that instead of a receiving a PURL, the contact will merely receive the top level domain name of the tracking web site. In this case, the web server 16 is configured to present web pages to the contact to ascertain the contact's identity. The contact could therefore be requested to input one or more of a contact email address, name and address, information indicating where they obtained the URL for the tracking domain, eg from an Internet Search Engine, a magazine, word of mouth, and preferences such as whether they would like to receive more information.

The memory or database 12 is also configured to hold tracking entity information, so that reports on tracking activity and efficacy can be generated and returned to a tracking entity at the end of a tracking campaign. It will be appreciated that this can be used to provide a tracking service to tracking entities as customers. A tracking entity can then upload information to generate PURLs, receive PURLs for distribution to their specified contacts, and log onto the tracking server to see the results of the tracking process.

In one example, the database 12 of the tracking server provides one set of data containing configuration information about all tracking entity customers and tracking domains. This logical database links customers to the data files they upload and from which the PURLs are generated; it also provides the memory space for the tracking domains and the links from them to the target domains; the schema of the uploaded files; and the campaigns and waves run.

There will be a set of data for each customer with the data for each campaign. This logical database includes for one tracking domain all the contact data the customer has uploaded for that campaign and the actions generated by those contacts.

Figure 7:
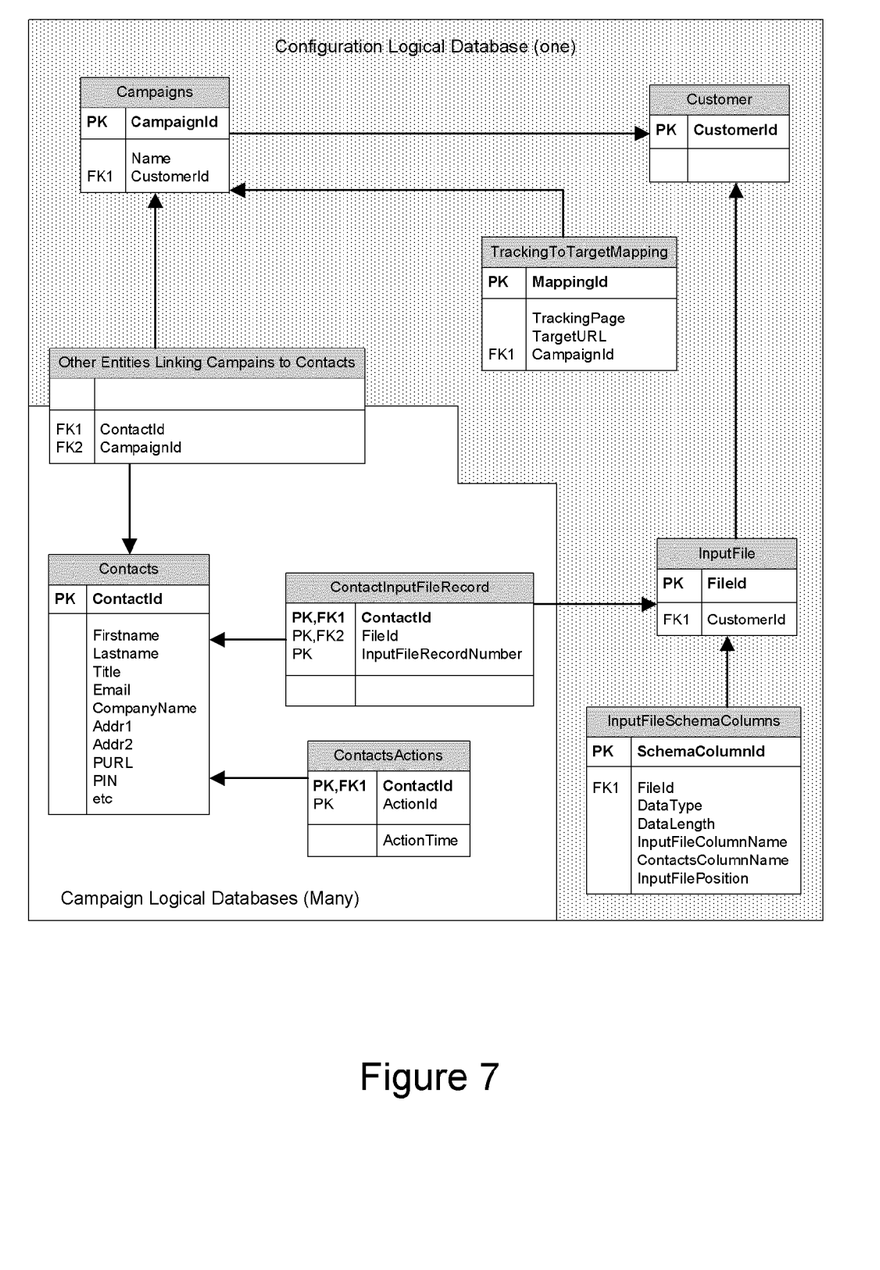
FIG. 7 is a schematic representation of a tracking entity database.

Referring now to FIG. 7, which is an expanded version, a Configuration Logical Database is shown. The database contains the configuration information for all customers, including the files they upload and the campaigns they are running. The logical entities specified in this database are as follows.

Customer: This entity has one record per customer. Each record contains a unique CustomerId field to identify each customer and to tie together records in other entities which relate to a particular customer. The Customer record is extended by an implementing application to store further information about a customer such as their name, address etc. as required Campaign: Each customer may run one or more campaigns. Each campaign has a one-to-one relationship with a tracking domain, and can be given a meaningful name. Each Campaign record has a unique CampaignId field to tie together records in other entities which relate to a particular campaign. Implementing applications can add further attributes to the Campaigns entity, for example start and end dates etc. as required.

InputFile

Each customer may upload one or more input files, containing the contacts information. Each InputFile record has a unique field to tie together records in other entities which relate to a particular file. Implementing applications add further attributes to the InputFile entity, for example upload date, number of records etc. as required.

Two other entities may be included in the configuration database but are only required to support specific implementation scenarios.

InputFileSchemaColumns

This entity is required where the implementing application allows uploaded files to be in any format, i.e. where the uploaded file records can include any fields the customer chooses to supply. If the format of the uploaded file is fixed and known in advance, this entity is not required. There will be one record in this entity for each column in each uploaded file. It will define for that column where and how it will be stored in the database.

TrackingToTargetMapping

This entity is required where the implementing application allows the customer to define what links will be used in the communications literature (pointing to the tracking website) and where these links should forward to in the target website. There will be one or many TrackingToTargetMapping records for each tracking domain, and hence each campaign.

There is also provided a set of data related to each campaign in a single logical campaign database. This data includes the contacts for each campaign and the actions they have performed as a result of the marketing literature. The logical entities required are as follows:

Contacts

Each valid record uploaded will result in a matching record in the Contacts entity. The Contacts entity stores as a minimum the information needed to generate the PURL (typically first name and last name) as well as the generated PURL and PIN. It can also store any other information required about the contact such as company name, email, address etc. Alternatively that information can be stored in other, linked entities as appropriate.

ContactActions

Every time a contact does something related to the communications literature, i.e. opens the email or navigates to the website, that action is tracked and stored as a record in the ContactActions entity. The record describes the action that happened, linked to the contact that performed that action, and the date and time the action was recorded. Implementing applications may choose to store further information about the action, for example information about the browser the contact was using, their IP address etc.

Other entities are included in the campaign databases but are only required to support specific implementation scenarios.

ContactInputFileRecord

If the original input file ever has to be recreated or the records linked to Contact records, the ContactInputFileRecord entity links the ContactId used to store the information in the database to the record number in the original input file.

Other Entities Linking Campaigns to Contacts

Depending on the requirements of the implementing application, contacts will be linked to campaigns. This can be a direct one-to-many link or with any of several levels in between, depending on the application's requirements.

Once contacts start receiving the PURLs from a tracking entity they will start responding to it. The system can identify and track when contacts follow a URL or PURL link embedded in the literature from whatever channel it was created. Tracking Entities can log on to the web server at any time and access reports to see the tracking results of their communications. At a high level this will show summary statistics about numbers of contacts performing each action, and allow drill-down to see the actions performed by an individual contact.

The system proposed provides a tracking service with several unique aspects:

1. It allows tracking of responses to communications sent via any channel, not just email. PURLs and PINs can be included in any communications medium and are sufficient to uniquely identify a contact and therefore track their responses.

2. No changes are required to a customer's website or infrastructure since all required configuration takes place at the tracking website, not the target. The system described here uses friendly and relevant PURLs which are suitable for use in any channel.

3. The customer is able to specify a friendly and relevant name for the tracking domain, rather than having to accept a generic domain. This allows the PURLs to be visible to the contact, and thus used in any channel, taking advantage of the psychological impact of seeing a URL personalized to the individual contact.

4. The customer can include absolutely any personalized information they hold about a contact in their communications.

Thus, the invention provides a web server that is configured to track requests for web pages on a third party web server. The tracking web server traps a web page request, such as a PURL (Personalised URL) for a personalised web page, before it attempts to serve the web page requested. The URL of the web page request is analysed to determine the location of the requested page on a third party server, and details of the contact with which the personalised web page is associated. Receipt of the web page request is then recorded in a memory associated with the server, and the web page request is forwarded to the third party server for processing. The redirection to the third party web server may be seamless, such that the contact requesting the page does not know of the redirection. In this way, a tracking web server is provided which can supply a personalised tracking and forwarding function.

The invention claimed is:

1. A tracking web server providing a tracking and forwarding function for requests to personalized Uniform Resource Locators (URL), the personalized URL indicating a first domain name of a first resource location, and a contact associated with the personalized URL, the tracking web server comprising:
  a memory configured to store:
    i) data defining a plurality of personalized URLs;
    ii) data indicating for which personalized URLs a corresponding resource request has been received; and
    iii) for each stored personalized URL, an identifier identifying a second network resource location, wherein the second network resource location is on a web server of a third party website proprietor, physically separate to the tracking web server, wherein a second domain of the second network resource location is different from the first domain of the first network resource location;
  a receiver for receiving a URL request, and for trapping the URL request before the tracking web server attempts to access the first resource location identified by the first domain name;
  an analyzer arranged to identify the first domain name indicated in the URL request, and, upon determining that the first domain name corresponds to a stored personalized URL, access the memory to determine the location of the second network resource location associated with the personalized URL, and update the memory to show that a request for the personalized URL has been received, wherein the analyzer formulates a new URL request based on the second domain name of the second network resource location; and
  a re-router arranged to transmit the new URL request to the second network resource location on the web server of the third party website proprietor.

2. The tracking web server of claim 1, wherein the identifier for the second network resource location indicates a web page.

3. The tracking web server of claim 2, wherein the web page is a private web page.

4. The tracking web server of claim 2, wherein the tracking web server has a server section for serving web pages requested by a URL request, and the memory is arranged to store one or more web pages,
wherein upon determining that the received URL is not a stored personalized URL, the analyzer is arranged to provide the URL request to the server section so that the requested web page can be served.

5. The tracking web server of claim 4, wherein the memory stores a security identifier associated with the personalized URL, and the analyzer is arranged to detect whether the security identifier is associated with a detected personalized URL, and upon determining that the security identifier is associated with the detected personalized URL, request that the server section serve a web page requesting that a user input the security identifier.

6. The tracking web server of claim 5, wherein the analyzer is further arranged to:
   i) detect user input that includes a security code entered into a web page served by the server section;
   ii) match the security code received in the user input against the security identifier stored in the memory; and
   iii) block the re-router from transmitting the new URL request if the security code input by the user does not match the stored security identifier.

7. The tracking web server of claim 1, wherein the identifier for the second network resource location is a URL, a URI, or an IP address.

8. The tracking web server of claim 1, having a personalized URL generator arranged to:
   i) receive personalized URL elements from a tracking entity, including the first domain name, and information unique to a contact to be associated with that personalized URL, as well as receiving an identifier for a target web site to be associated with the personalized URL, and
   ii) generate a text string comprising the elements received and representing a personalized URL, and output this to the tracking entity.

9. The tracking web server of claim 8, wherein the personalized URL elements include the name of a web page on the first domain.

10. The tracking web server of claim 8, wherein the personalized URL generator is arranged to register the first domain name of the personalized URL with a Domain Name Server (DNS) so that the first domain name points to the IP address of the tracking web server.

11. The tracking web server of claim 8, wherein the analyzer is arranged to store in the memory, one or more of:
   i) whether a URL request for a personalized URL request has been received;
   ii) data indicating the dates/and or times the request for the personalized URL was received; and
   iii) the IP address from which the URL request was received.

12. A method of tracking and forwarding requests to personalized Uniform Resource Locators (URL) with a tracking web server, the personalized URL indicating a first domain name of a first resource location, and a contact associated with the personalized URL, the method comprising:
   storing:
   i) data defining a plurality of personalized URLs;
   ii) data indicating for which personalized URLs a corresponding resource request has been received; and
   iii) for each stored personalized URL, an identifier identifying a second network resource location, wherein the second network resource location is on a web server of a third party website proprietor, physically separate to the tracking web server;
   receiving a URL request at the tracking web-server, and trapping the URL request before the tracking web server attempts to access the first resource location identified by the first domain name;
   identifying the first domain name indicated in the URL request;
   upon determining that the first domain name corresponds to a stored personalized URL, accessing the memory to determine the location of the second network resource location associated with the personalized URL, and updating the memory to show that a request for the personalized URL has been received;
   formulating a new URL request based on a second domain name of the second network resource location, wherein the second domain name of the second network resource location is different from the first domain name; and
   transmitting the new URL request to the second network resource location on the web server of the third party website proprietor.

13. The method of claim 12, wherein the identifier for the second network resource location indicates a web page.

14. The method of claim 13, wherein the web page is a private web page.

15. The method of claim 13, comprising, upon determining that the received URL is not a stored personalized URL, providing the URL request to a server section for so that the requested web page can be served.

16. The method of claim 15, comprising:
   storing a security identifier associated with the personalized URL;
   detecting whether a security identifier is associated with a detected personalized URL, and
   upon determining that the security identifier is associated with the detected personalized URL, requesting that the server section serve a web page requesting that a user input the security identifier.

17. The method of claim 16, comprising:
   i) detecting user input entered into a web page served by the server section, the user input including a security code;
   ii) matching the security code against the stored security identifier; and
   iii) blocking the transmission of the URL if the security code input by the user does not match the stored security identifier.

18. The method of claim 12, wherein the identifier for the second network resource location is a URL, a URI, or an IP address.

19. The method of claim 12, comprising:
   receiving personalized URL elements from a tracking entity, including the first domain name, and information unique to a contact to be associated with that personalized URL, as well as receiving an identifier for a target web site to be associated with the personalized URL, and
   generating a text string comprising the elements received and representing a personalized URL, and output this to the tracking entity.

20. The method of claim 19, wherein the personalized URL elements include the name of a web page on the tracking domain.

21. The method of claim 19, comprising registering the first domain name of the personalized URL with a Domain Name Server (DNS) so that the first domain name points to the IP address of the tracking web server.

22. The method of claim 21, comprising storing in the memory, one or more of:
  i) whether a URL request for a personalized URL request has been received;
  ii) data indicating the dates/and or times the request for the personalized URL was received; and
  iii) the IP address from which the URL request was received.

23. A computer program product comprising a non-transitory computer readable medium on which computer code is stored, said computer code when executed by a computer causing the computer to track and forward requests to personalized Uniform Resource Locators (URL) with a tracking web server, the personalized URL indicating a first domain name of a first resource location, and a contact associated with the personalized URL;
  said tracking and forwarding comprising:
  storing:
    i) data defining a plurality of personalized URLs;
    ii) data indicating for which personalized URLs a corresponding resource request has been received; and
    iii) for each stored personalized URL, an identifier identifying a second network resource location, wherein the second network resource location is on a web server of a third party website proprietor, physically separate to the tracking web server;
  receiving a URL request at the tracking web server, and trapping the URL request before the tracking web server attempts to access the first resource location identified by the first domain name;
  identifying the first domain name indicated in the URL request;
  upon determining that the first domain name corresponds to a stored personalized URL, accessing the memory to determine the location of the second network resource location associated with the personalized URL, and updating the memory to show that a request for the personalized URL has been received;
  formulating a new URL request based on a second domain name of the second network resource location, wherein the second domain name of the second network resource location is different from the first domain name; and
  transmitting the new URL request to the second network resource location on the web server of the third party website proprietor.

24. The computer program product of claim 23, wherein the identifier for the second network resource location indicates a web page.

25. The computer program product of claim 24, wherein the web page is a private web page.

26. The computer program product of claim 24, wherein said computer code when executed by a computer causes the computer, upon determining that the received URL is not a stored personalized URL, to provide the URL request to a server section for so that the requested web page can be served.

27. The computer program product of claim 26, wherein said computer code when executed by a computer causes the computer to:
  store a security identifier associated with the personalized URL;
  detect whether a security identifier is associated with a detected personalized URL, and
  upon determining that the security identifier is associated with the detected personalized URL, request that the server section serve a web page requesting that a user input the security identifier.

28. The computer program product of claim 23, wherein said computer code when executed by a computer causes the computer to:
  i) detect user input entered into a web page served by the server section, the user input including a security code;
  ii) match the security code against the stored security identifier; and
  iii) block the transmission of the URL if the security code input by the user does not match the stored security identifier.

29. The computer program product of claim 23, wherein the identifier for the second network resource location is a URL, a URI, or an IP address.

30. The computer program product of claim 23, wherein said computer code when executed by a computer causes the computer to:
  receive personalized URL elements from a tracking entity, including the second domain name, and information unique to a contact to be associated with that personalized URL, as well as receiving an identifier for a target web site to be associated with the personalized URL, and
  generate a text string comprising the elements received and representing a personalized URL, and output this to the tracking entity.

31. The computer program product of claim 30, wherein the personalized URL elements include the name of a web page on the first domain.

32. The computer program product of claim 30, wherein said computer code when executed by a computer causes the computer to register the first domain name of the personalized URL with a Domain Name Server (DNS) so that the first domain name points to the IP address of the tracking web server.

33. The computer program product of claim 32, wherein said computer code when executed by a computer causes the computer to store in memory, one or more of:
  i) whether a URL request for a personalized URL request has been received;
  ii) data indicating the dates/and or times the request for the personalized URL was received; and
  iii) the IP address from which the URL request was received.

* * * * *